United States Patent [19]

Rabeony et al.

[11] Patent Number: 6,015,929
[45] Date of Patent: Jan. 18, 2000

[54] GAS HYDRATE ANTI-AGGLOMERATES

[75] Inventors: Manese Rabeony, Piscataway; Dennis George Peiffer, Annandale, both of N.J.; Christine Ann Costello, Easton, Pa.; Karla Schall Colle, Houston, Tex.; Pamela J Wright, Easton, Pa.; Larry Dalton Talley, Friendswood, Tex.

[73] Assignee: Exxon Research and Engineering Co., Florham Park, N.J.

[21] Appl. No.: 09/023,580

[22] Filed: Feb. 13, 1998

Related U.S. Application Data

[63] Continuation-in-part of application No. 08/747,949, Nov. 12, 1996, abandoned, which is a continuation of application No. 08/306,350, Sep. 15, 1994, abandoned.

[51] Int. Cl.$^7$ .................................. C07C 7/20; F17D 1/05
[52] U.S. Cl. ................................ 585/15; 585/950; 95/153
[58] Field of Search ..................... 585/15, 950; 95/153; 166/310, 371; 137/3, 13

[56] References Cited

U.S. PATENT DOCUMENTS

| | | | |
|---|---|---|---|
| H1749 | 9/1998 | Colle et al. ................................ | 585/15 |
| 4,456,067 | 6/1984 | Pinner, Jr. . | |
| 4,856,589 | 8/1989 | Kuhlman et al. . | |
| 4,856,593 | 8/1989 | Matthews et al. . | |
| 4,915,176 | 4/1990 | Sugier et al. . | |
| 4,973,775 | 11/1990 | Sugier et al. . | |
| 5,076,364 | 12/1991 | Hale et al. . | |
| 5,244,878 | 9/1993 | Sugier et al. . | |
| 5,841,010 | 11/1998 | Rabeony et al. ............................ | 585/3 |

FOREIGN PATENT DOCUMENTS

| | | |
|---|---|---|
| 2101799 | 2/1994 | Canada . |
| 0309210 | 3/1989 | European Pat. Off. . |
| 0457375 | 11/1991 | European Pat. Off. . |
| 582507 | 2/1994 | European Pat. Off. . |
| 2618876 | 2/1989 | France . |
| 1799286 | 2/1993 | Russian Federation . |
| 1391692 | 4/1988 | U.S.S.R. . |
| WO9325798 | 12/1993 | WIPO . |

OTHER PUBLICATIONS

"Effect of Surfactants on hydrate Formation Kinetics," Kalogerakis et al. SPE 1993 Internaional Oilfield Chem Symposium (New Orleans, Mar. 2–5, 1993) Proceedings 375–83 (1993).

"Surfactants in Oil Production," Muijs, R. Soc. Chem., (Chemical Oil Ind. Developments & Applications) V 97, 277–97, 1991.

"A Molecular Mechanism for Gas Hydrate Nucleation from Ice," Sloan. et al, (continued AIChE Journal, V37, N.9, 1281–92, (Sep. 1991).

"Surfacants Studied as Hydrate–Formation Inhibitors," Kuliev et al, Gazovoe Delo (1972), (10), 17–19. (Translation enclosed).

"Effect of Lower Alcohols on formation of Crystallohydrates of Liquids and Gases," Krasnov, Gazovoe Delo (1966), (12), 9–11 (Translation enclosed).

"Clathrate Hydrates," P. Englezos, Ind. Eng. Chem. Res. 1993, 32, 1251–1274.

"Recent Developments in Gas Dehydration and Hydrate Inhibition," Hubbard, et al, SPE 21507, pp. 263–276 (1991).

"Natural Gas Hydrate Phase Equilibria and Kinetics: Understanding the State of the Art," Sloan, Revue De L'Institut Francais Du Petrole, (continued) vol. 45, No. 2, Mars–Avril 1990.

*Primary Examiner*—Walter D. Griffin
*Attorney, Agent, or Firm*—Paul E. Purwin; Kenneth W. Peist

[57] ABSTRACT

This invention is directed toward a method for inhibiting the formation (nucleation, growth and agglomeration) of clathrate hydrates. The method comprises adding into a mixture of hydrate forming substituents and water, an effective amount of a hydrate anti-agglomerate selected from the group consisting of anionic, cationic, non-ionic and zwitterionic hydrate anti-agglomerate. The hydrate anti-agglomerant has a polar head group and a nonpolar tail group said nonpolar tail group not exceeding 11 carbon atoms in the longest carbon chain.

7 Claims, 4 Drawing Sheets

GAS HYDRATE ANTI-AGGLOMERATES

CROSS-REFERENCE TO RELATED APPLICATIONS

This application is a Continuation-in-Part of U.S. patent application Ser. No. 747,949 filed Nov. 12, 1996, now abandoned, which is a Rule 60 Continuation of U.S. patent application Ser. No. 306,350 filed Sep. 15, 1994 and now abandoned.

FIELD OF THE INVENTION

The invention is a method for inhibiting the formation growth and agglomeration of clathrate hydrates, also referred to as gas hydrates, in natural gas, petroleum gas or other gases.

BACKGROUND OF THE INVENTION

Carbon dioxide, hydrogen sulfide and various hydrocarbons, such as methane, ethane, propane, normal butane and isobutane, are present in natural gas and other petroleum fluids. However, water is typically found mixed in varying amounts with such petroleum fluids constituents. Under conditions of elevated pressure and reduced temperature clathrate hydrates can form when such petroleum fluids constituents or other hydrate formers are mixed with water. Clathrate hydrates are water crystals which form a cage-like structure around guest molecules such as hydrate forming hydrocarbons or gases. Some hydrate forming hydrocarbons include, but are not limited to, methane, ethane, propane, isobutane, butane, neopentane, ethylene, propylene, isobutylene, cyclopropane, cyclobutane, cyclopentane, cyclohexane and benzene. Some hydrate forming gases include but are not limited to oxygen, nitrogen, hydrogen sulfide, carbon dioxide, sulfur dioxide and chlorine.

Gas hydrate crystals or gas hydrates are a class of clathrate hydrates of particular interest to the petroleum industry because of the pipeline blockages that they can produce during the production and transport of natural gas and other petroleum fluids. For example, ethane, at a pressure of about 1 MPa, can form gas hydrates with water at temperatures below 4° C., while at a pressure of 3 MPa it can form gas hydrates with water at temperatures below 14° C. Such temperatures and pressures are not uncommon for many operating environments where natural gas and other petroleum fluids are produced and transported.

As gas hydrates agglomerate they can produce hydrate blockages in the pipe or conduit used to produce and/or transport natural gas or other petroleum fluid. The formation of such hydrate blockages can lead to a shutdown in production and thus substantial financial losses. Furthermore, restarting a shutdown facility, particularly an offshore production or transport facility, is difficult because significant amounts of time, energy, and materials, as well as various engineering adjustments, are required to remove the hydrate blockage.

A variety of measures have been used by the oil and gas industry to prevent the formation of hydrate blockages in oil or gas streams. Such measures include removing free water, reducing the water content of the hydrocarbon phase, maintaining the temperatures and/or pressure outside hydrate formation conditions and introducing an antifreeze such as methanol, ethanol, propanol or ethylene glycol. However, the amount of antifreeze required to prevent hydrate blockages is typically between 10% and 20% by weight of the water present in the oil or gas stream. Consequently, several thousand gallons per day of such solvents are usually required. Such quantities present handling, storage, recovery and potential toxicity issues. Moreover, these solvents are difficult to completely recover from the production or transportation stream. From an engineering standpoint, maintaining temperature and/or pressure outside hydrate formation conditions requires design and equipment modifications, such as insulated or jacketed piping. Such modifications are costly to implement and maintain. Furthermore, complex and difficult procedures must be used to ensure that the hydrate blockage is melted safely.

References also show that the effects of gas hydrates can be reduced, in the event that hydrates form, through the presence of compounds that substantially prevent the agglomeration (sometimes referred to as "global formation") of hydrates. For example, surfactants are known to prevent hydrate agglomeration when used at or near the critical micelle concentration (CMC). These surfactants have oleophilic chains having at least 12 carbon atoms.

Consequently, there is a need for a gas hydrate anti-agglomerate useful at low concentration that can be conveniently stored, handled and dissolved in the water phase associated with the produced or transported petroleum fluids. Such an anti-agglomerate would prevent hydrate blockages by inhibiting the agglomeration of gas hydrate crystals in an oil or gas stream.

SUMMARY OF THE INVENTION

This invention is directed toward a method for inhibiting the formation (nucleation, growth and agglomeration) of clathrate hydrates.

The method comprises adding into a mixture comprising hydrate forming substituents and water, an effective amount of a hydrate anti-agglomerate selected from the group consisting of anionic, cationic, non-ionic and zwitterionic compounds having a polar head group directly bonded to a nonpolar tail group selected from the group consisting of alkyl, alkenyl and alkenyl groups, the nonpolar tail group having fewer than 11 carbon atoms in the longest carbon chain.

BRIEF DESCRIPTION OF THE DRAWINGS

FIG. 1

FIG. 2 is a graphical representation of the viscosities of tetrahydrofuran hydrates at 0° C. following addition of the noted hydrate anti-agglomerates.

DETAILED DESCRIPTION OF THE INVENTION

Figure 1A:
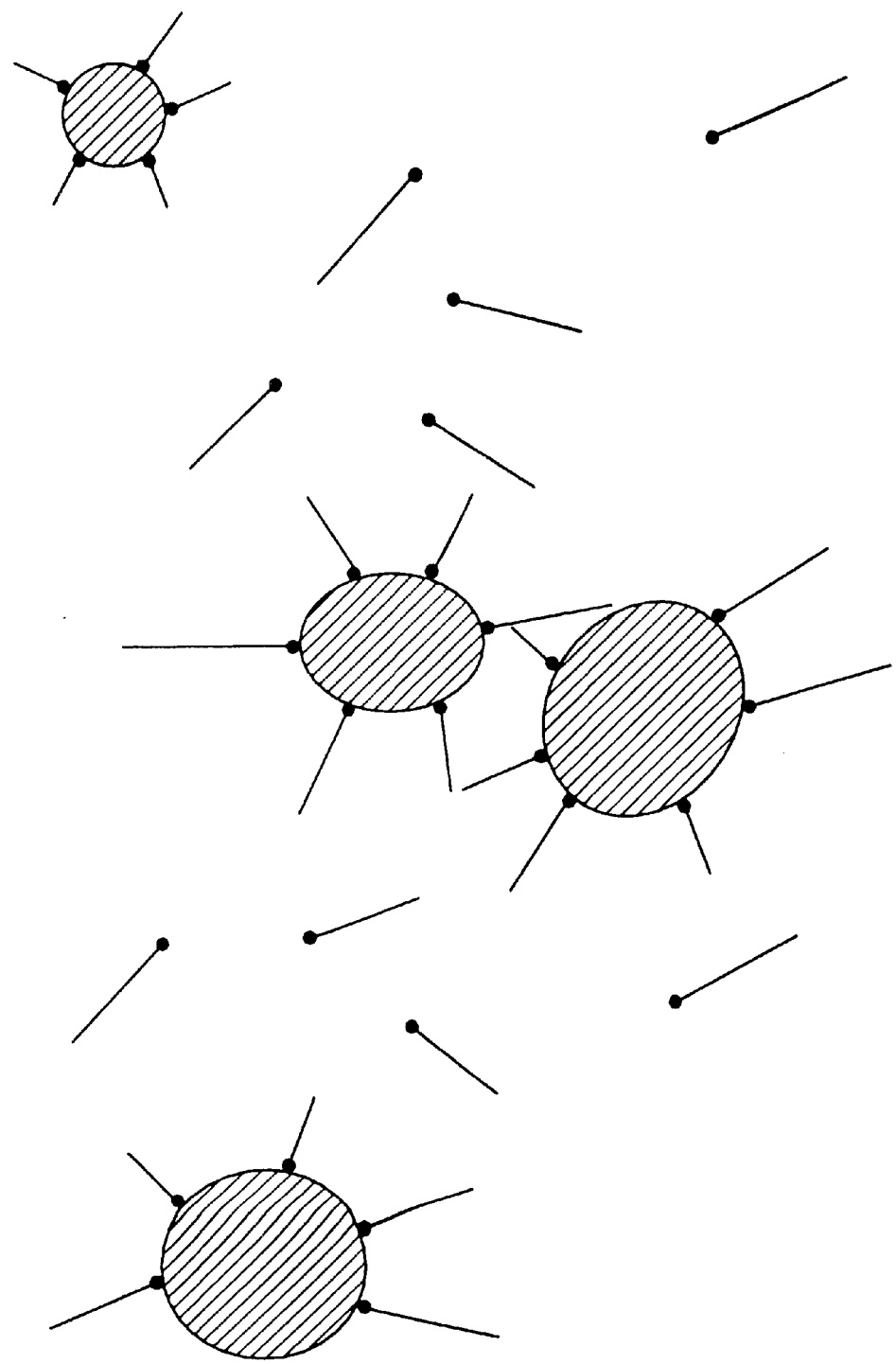
FIG. 1A schematically shows a solution of non-agglomerated hydrates (represented by shaded circles) and the anti-agglomerates of this invention (represented by solid bars with circular ends respectively illustrating the hydrophobic and hydrophilic parts) in a slurry of hydrate-forming constituents at $T=T_{eq}$. The anti-agglomerate concentration is below the CMC.

The invention inhibits the agglomeration of hydrates in a fluid having hydrates or hydrate forming constituents. Hydrates may agglomerate in a fluid that is flowing or substantially stationary, and are often most problematic in flowing fluid streams conveyed in a pipe. For example, flow restrictions arising from partial or complete blockages in a fluid stream can arise as hydrates adhere to and agglomerate along the inside wall of the pipe used to convey the fluid. Nonetheless, the invention can be used for inhibiting hydrate agglomeration anti-agglomerates in substantially stationary fluids.

The hydrate anti-agglomerates of this invention have anionic, cationic, non-ionic and zwitterionic polar head groups, and a nonpolar tail group selected from the group consisting of alkyl alkynyl and alkenyl groups. Preferably alkyl tail groups will be used. The alkyl group of the tail may be normal alkyl, branched alkyl or cyclic alkyl. Preferably, the alkyl group will be normal or branched alkyl group, most preferably a normal alkyl group. The longest carbon chain length of the tail will range from 2 to 11, preferably 2 to 8 carbons in length. However, if an alcohol (including diols) is selected as the anti-agglomerate, the longest carbon chain length of the tail group will preferably range from $C_4$ to $C_{11}$, more preferably from $C_4$ to $C_8$, and most preferably $C_4$. Examples of suitable hydrate anti-agglomerants are sodium valerate, n-butanol, $C_4$–$C_8$ zwitterion, (zwitterionic head group with $C_4$–$C_8$ tail group), 1-butanesulfonic acid Na salt, butanesulfate Na salt, alkylpyrrolidones and mixtures thereof, with butanesulfate Na salt being preferred. The tail group chain length may vary within the specified range depending on the head group selected. All of the above compounds are commercially available or readily synthesized by literature methods. The head and tail groups discussed herein are also commonly referred to as hydrophilic and lipophilic groups, respectively. Furthermore, the head group defines the type of anti-agglomerate, e.g., an anti-agglomerate with a zwitterionic head group would be a zwitterionic anti-agglomerate.

The anti-agglomerates utilized in the instant invention have their alkyl tail groups directly bonded to the cationic, nonionic, zwitterionic or anionic head group. This means that the first carbon atom of the tail group in the longest carbon chain is directly bonded to the head group. Hence, there are no intervening functional groups between the head and tail group such as ester or aryl groups which would be present in compounds such as alkylarylsulfates and dioctyl-sulfosuccinate Na salt having an intervening aryl and ester group respectively. Such intervening groups are often referred to as connector groups. No such groups are present in the anti-agglomerates of this invention. Thus, the anti-agglomerate's head and tail groups are directly attached or directly adjacent to each other.

The hydrate or anti-agglomerate is introduced into the mixture comprising hydrate forming constituents using mechanical equipment, such as, chemical injection pumps, piping tees, injection fittings, and other devices which will be apparent to those skilled in the art. However, such equipment is not essential to practicing the invention. To ensure an efficient and effective treatment of the mixture with the anti-agglomerate, all that is necessary is that the hydrate anti-agglomerate disperse through the mixture sufficiently enough to be able to interact with any water within the mixture, thus inhibiting hydrate agglomeration. Merely introducing the hydrate anti-agglomerate into the hydrate forming constituent and water mixture is enough to achieve the necessary amount of dispersion.

The anti-agglomerate primarily serves to inhibit the aggregation of hydrates, rather than inhibit or reverse their formation. However, it is important to treat the fluid prior to substantial formation of hydrates. As a wet petroleum fluid cools, it will eventually reach a temperature, known as the hydrate equilibrium dissociation temperature or $T_{eq}$, below which hydrate formation is thermodynamically favored. A petroleum fluid's $T_{eq}$ will shift as the pressure applied to the fluid and its composition change. Various methods of determining a fluid's $T_{eq}$ at various fluid compositions and pressures are well known to those skilled in the art. Preferably, the fluid should be treated with the anti-agglomerate when the fluid is at a temperature greater than its $T_{eq}$. It is possible, but not preferable, to introduce the anti-agglomerate while the temperature is at or slightly below the fluid's $T_{eq}$, preferably before clathrate hydrates have begun to form.

The quantity of hydrate anti-agglomerate added to the hydrate forming constituent/water mixture will be an effective amount which inhibits hydrate agglomeration or aggregation. The minimum amount required can be determined by those skilled in the art by the well-known atmospheric pressure test often referred to as the tetrahydrofuran (THF) test, taking into consideration operating conditions for actual use.

The THF test typically uses 3 mL of tetrahydrofuran (THF) and 9 mL of ASTM synthetic seawater (SSW) containing the desired amount of anti-agglomerate. The THF and SSW are placed in a capped test tube (15 mm OD×12.5cm long) with a one centimeter stainless steel ball. Each tube is placed in a ferriswheel-type holder and placed in a cooling bath held near 0° C. The tubes are monitored visually and recorded with a video camera. As hydrate formation proceeds the viscosity of the THF/SSW solution increases. In many instances the solution's viscosity will become high enough for the ball to stop moving. The time required for the stainless steel ball to stop moving the full length of the tube is referred to as ball stop time or BST.

The BST is an approximate indication of an anti-agglomerate's effectiveness. Because the THF/SSW solution has a $T_{eq}$ of about 2–5° C. and THF is miscible with water, hydrate formation and agglomeration are substantially accelerated for the THF/SSW solution as compared to petroleum fluids conveyed in a pipeline or flowline under typical field conditions. Therefore, BSTs are useful for indicating which anti-agglomerates may be effective under field applications. A BST for a THF/SSW solution with an anti-agglomerate that is about three times the BST for a THF/SSW control solution with no anti-agglomerate present indicates that the composition demonstrates a threshold anti-agglomeration effect. Therefore, as used herein, a threshold anti-agglomeration concentration ("TAC") is the concentration in a THF/SSW solution required to produce a BST which is about three times the BST for a THF/SSW control solution. Because the THF test results are sensitive to variations in the temperature at which the test is run, rotation frequency of the tube, clearances between the stainless steel ball and tube wall, etc., it is important to run a THF/SSW control solution with each anti-agglomerate evaluation to ensure that TAC is accurately measured through the observation of a reliable threshold anti-agglomeration effect.

The maximum amount of hydrate anti-agglomerate to be added is that amount that will result in a phase separation from or precipitation out of the hydrate forming constituent/water mixture. Preferably, the composition will be added in amounts ranging from about 0.05 to 5 wt %, more preferably 0.5 to 2 wt % based on the weight of water in the mixture being acted upon.

Typically, operating conditions will be temperatures of from about 0 to about 80° F. (−17.78° C. to 26.67° C.), preferably about 32 to about 80° F. (0° C. to 26.67° C.), and pressures of from about 0 to about 10,000 psi (0 to 68,947.57 kPa), preferably about 200 to 3000 psi (1,378.95 to 20,634.27 kPa).

Ranges outside of the above ranges are contemplated so long as the hydrate anti-agglomerate displays a threshold anti-agglomeration concentration as per the THF test at such conditions.

The instant process can be applied to any gas/water mixture where clathrate hydrates can form. For example, the process can be applied to natural gas reserves, petroleum reserves, etc. Preferably, the process will be applied to natural gas reserves. The invention is particularly useful for preventing plugging by gas clathrate-hydrates in oil and gas transmission pipelines.

Applicants, though not wishing to be bound, believe that upon addition, the anti-agglomerate remain dispersed in solution. It is believed that the head groups adsorb to the hydrate surface, while the tails act as lubricating agents when two hydrate crystals come in contact through shear, thus inhibiting hydrate agglomeration or aggregation.

It has been discovered that the hydrate anti-agglomerates of this invention are effective at concentrations well below the CMC in contrast to the anti-agglomeration compounds known in the art.

While not wishing to be bound by any theory, it is believed that at concentrations below the CMC the anti-agglomerates is available to prevent hydrate agglomeration because only a small portion, if any, of the additive is in the form of micelles. See FIG. 1A.

Figure 1B:
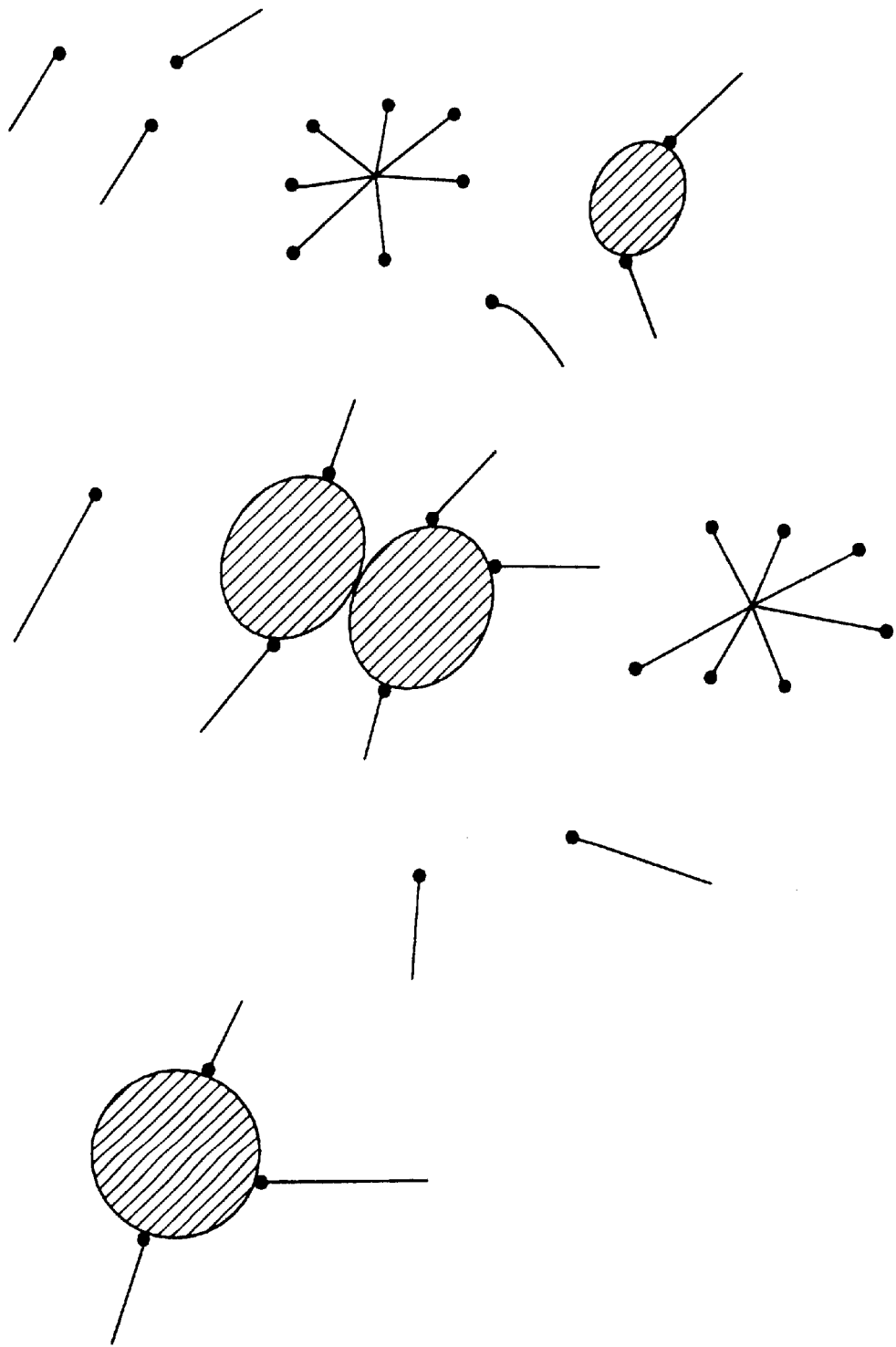
FIG. 1B schematically shows such a solution at an anti-agglomerate concentration approximately equal to the CMC.

As additive concentration approaches the CMC, the additive begins to form micelles, and consequently is unavailable to prevent hydrate agglomeration in accordance with this invention. See FIG. 1B.

Figure 1C:
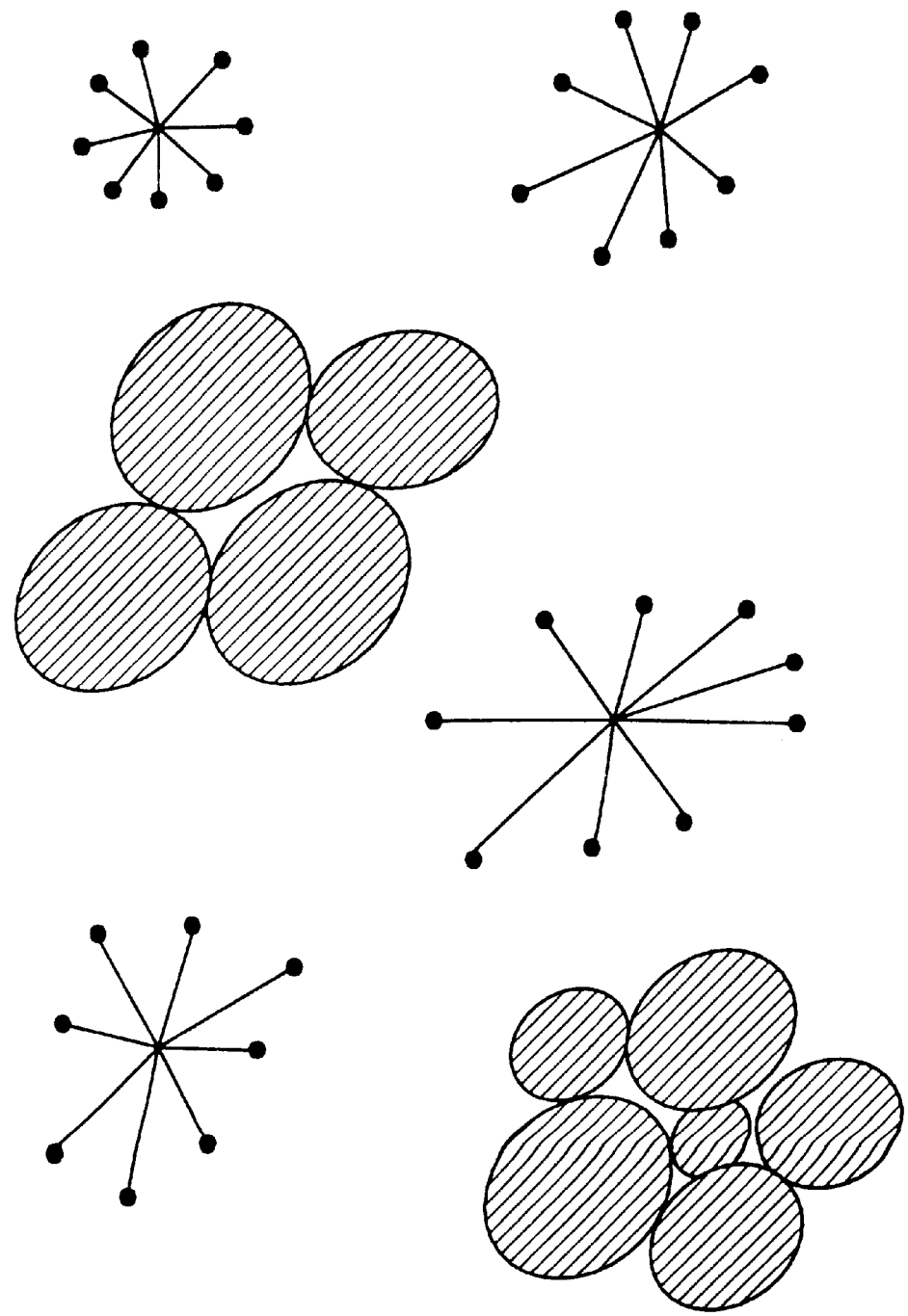
FIG. 1C schematically shows such a solution at an anti-agglomerant concentration greater than the CMC.

At additive concentration above the CMC, substantially all the additive is in the form of micelles, and is therefore unavailable as an anti-agglomerate. See FIG. 1C.

As is well-known in compounds having a hydrophobic part and a hydrophilic part, the CMC increases when the size of the hydrophobic part is decreased and the size of the hydrophilic part is unchanged. Consequently, the preferred anti-agglomerates of this invention have short-chain hydrocarbyl groups. Of these, end-functionalized short-chain hydrocarbyl groups are most preferred.

In the practice of the present invention, the additive is used in concentration ranging from 0.001% to about 50% of the CMC, preferably in the range of about 0.5% to about 30% of the CMC.

It should also be noted that the adduction of ethylene oxide to the alkyl chain of the tail group of the hydrate anti-agglomerate increases its solubility in brines containing multivalent cations at concentrations >1000 ppm. This effect reduces scaling problems on pipeline surfaces and plugging of filters at separation facilities that would result from the use of anti-agglomerates without ethylene oxide adducts in concentrated brine solutions. It is believed that the adduction of ethylene oxide to possible anti-agglomerates follows the scheme below:

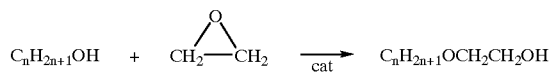

A nonionic surfactant is shown which is known to form a second liquid phase as the salinity of the brine being acted upon increases. The adduction of ethylene oxide, to yield an ethoxylated alcohol, allows the anti-agglomerate to remain dispersed in the brine and to hence be utilized in saline environments and in environments where equivalent molar amounts of multivalent cations relative to anti-agglomerate are present. The adduction of ethylene oxide to an alkyl chain is readily accomplished via techniques known to those skilled in the art.

As used herein, multivalent cations include cations having a valence of $^+2$ or greater, such as calcium, magnesium, iron ($^+2$ and $^+3$) and mixtures thereof The following examples are for illustration and are not meant to be limiting.

EXAMPLES

Example 1

Synthesis of $C_4$-Zwitterion

A 250 ml round bottom flask was fitted with a condenser and a nitrogen purge. N,N-dimethylbutylamine (20.0 g, 0.198 mol) and butane sultone (29.6 g, 0.218 mol) were added to 80 cc of toluene (used as received from Baker), forming a clear solution. After stirring at room temperature for 30 minutes, however, an opacity developed. The mixture was then reacted at 50° C. for 24 hours, resulting in an opaque solution and a precipitate. The reaction mixture was filtered, washed with an excess of toluene, and dried overnight in a vacuum oven at 60° C. (yield 21 g; 48%). The product was characterized by $^1$H NMR (pertinent data are in Table 1) and was consistent with the assigned structure:

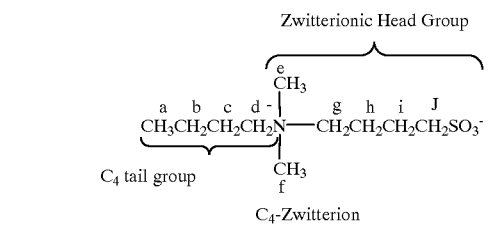

TABLE 1

NMR Characterization Data For $C_4$-Zwitterion

| (ppm) | Multiplicity | # Protons | Assignment |
|---|---|---|---|
| 0.883 | triplet | 3 | a |
| 1.313 | multiplet | 2 | b |
| 1.667 | multiplet | 2 | c |
| 1.734 | multiplet | 2 | i |
| 1.857 | multiplet | 2 | h |
| 2.899 | triplet | 2 | j |
| 2.985 | singlet | 6 | e and f |
| 3.237 | 2 multiplets | 4 | d and g |

The product is readily soluble in both fresh water and brine.

This synthesis procedure was used to produce water-soluble materials of varied alkyl chain lengths. The amines used in conjunction with butane sultone include:

N,N-dimethylhexylamine
N,N-dimethyldodecylamine
N,N-dimethyloctylamine

Example 2

Performance Testing-Control Sample

Natural gas hydrates occur only at high pressures not readily accessible under normal laboratory conditions. It is known in the art that tetrahydrofuran (THF) hydrates are good model systems for natural gas hydrates. These hydrates form at 4° C. (atmospheric pressure) at a water:THF molar ratio of 17:1. Thus, if additives function successfully to kinetically inhibit the agglomeration of THF hydrates, then they should perform similarly on gas hydrates. Furthermore, if viscosities of the THF/hydrate slurries are low at 0° C., then they should be pumpable in most of the production, transport, and processing conditions found in the field.

In order to test the effectiveness of these hydrate anti-agglomerates, slurries were prepared both with and without anti-agglomerates. The viscosities of these slurries were measured with a Brookfield viscometer fitted with a Heliopath spindle.

In a control experiment (i.e., one in which no anti-agglomerate was added), 25 cc THF was added at room temperature to 75 cc of brine solution, producing a 13:1 molar ratio water:THF mixture. (The brine is a standard ASTM solution). This ratio was used to ensure that all of the water was used to make hydrate and that no water was consumed as ice. The solution was stirred for approximately 20 minutes. It was then loaded into a water-jacketed cell containing a magnetic stir bar. The cell was cooled to 0° C. with mild stirring. At this point, the solution was super-cooled. Upon cooling, there was a noticeable turbidity. Once at °C., the system was "shocked" into hydrate formation by rapid stirring. Immediately, hydrate formed, with a characteristic temperature rise of a few °C. After about an hour, the magnetic stirrer could no longer stir the slurry. Attempts to measure the viscosity with the Brookfield viscometer failed because the viscosity was so high.

Example 3
Performance Testing-Effect of Anti-Agglomerates

The effect of the anti-agglomerates is demonstrated by this example.

25 cc THF was added in a similar manner as described in Example 2 to 75 cc of brine, however, the brine contained 2 g (0.0161 mol) sodium valerate. The hydrate was formed as described in Example 2. This time, however, an hour after the hydrate formed, a slurry resulted from which a viscosity measurement was made. Thus, viscosity measured at 0° C. on a Brookfield viscometer equipped with a Heliopath Spindle (Spindle TD) was 15,171 cps. This demonstrates that addition of the sodium valerate significantly reduced the viscosity when compared to a solution containing no anti-agglomerate.

Figure 2:
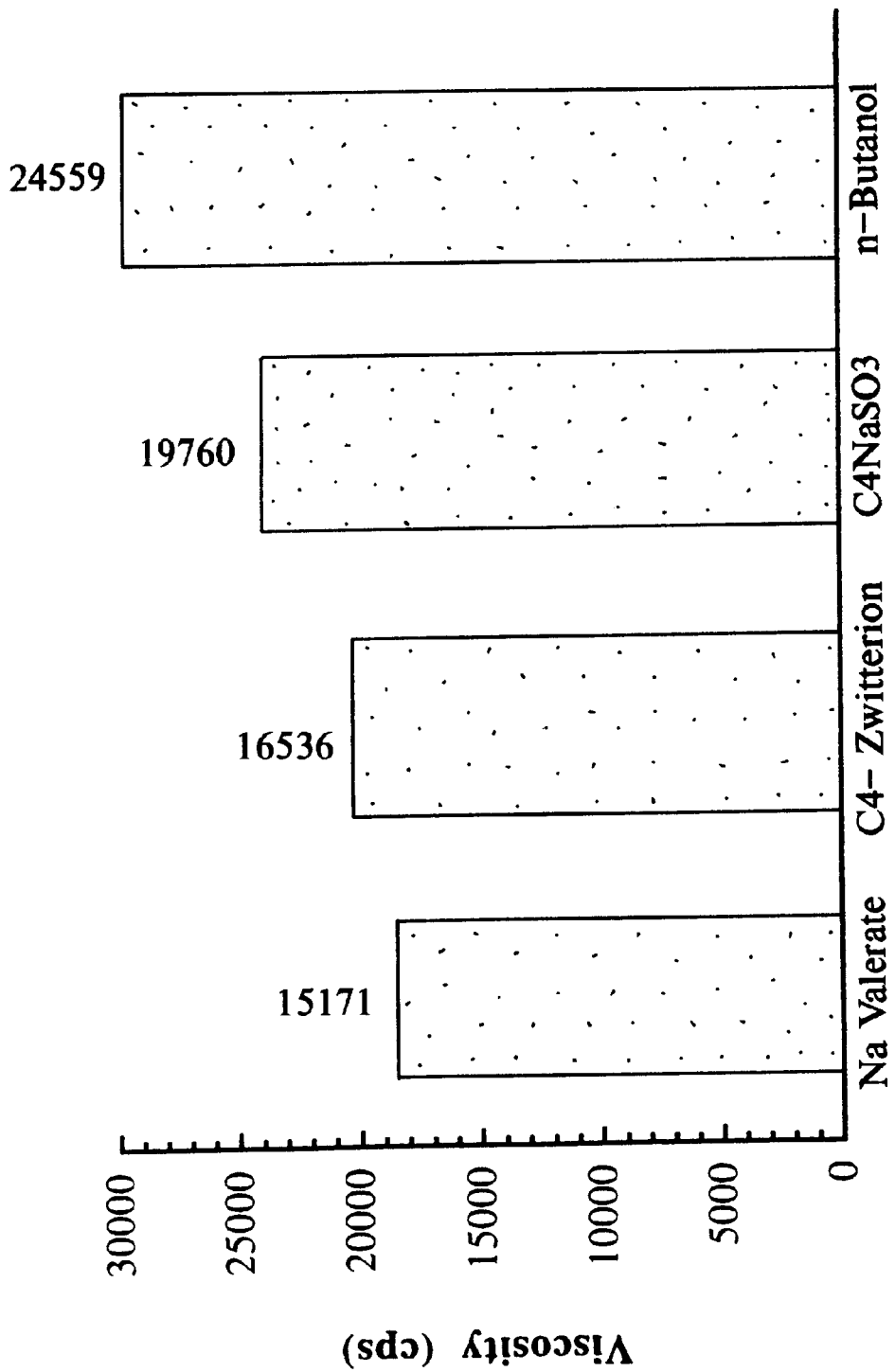
FIG. 2

The other anti-agglomerates tested, n-butanol, $C_4$-zwitterion and 1-butanesulfonic acid, Na salt, produced hydrate-containing slurries with similarly low viscosities. They were each dosed at 0.0161 moles per 75 cc of brine. The results of these measurements are shown in FIG. 2. From the values for the viscosity it has been demonstrated that the hydrates formed in the presence of these anti-agglomerates have low enough viscosities to be pumped.

While both the sodium valerate and $C_4$-zwitterion show substantial viscosity reduction, the $C_4$-zwitterion is the preferred compound because zwitterions are generally less sensitive to the type of salt and salt concentrations in the hydrate-forming slurry.

$(CH_3CH_2CH_2CH_2)OH$ n-Butanol

-continued

Sodium Valerate (tail group indicated by brackets)

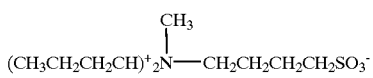

($C_4$)-Zwitterion

1-Butanesulfonic acid, Na salt

Example 4
Effect of Tail Chain Length

This example will demonstrate that increasing "tail length" adversely affects the anti-agglomerate effectiveness.

Experiments similar to those described in Example 3 were carried out on a series of the zwitterionic anti-agglomerates of increasing tail length. The results are tabulated below in Table 2.

Table 2 shows that anti-agglomerate effectiveness decreases as tail length increases. For the zwitterionic compounds of this example, no anti-agglomeration effectiveness was observed for compounds having tails with 11 carbon atoms or more.

TABLE 2

THF Hydrate Viscosity as a Function of Additive Tail Length $$CH_3(CH_2)_n{}^+\overset{\underset{\displaystyle CH_3}{|}}{\underset{\underset{\displaystyle CH_3}{|}}{N}}-CH_2CH_2CH_2CH_2SO_3^-$$

| n | Viscosity (cps) |
|---|---|
| 3 | 12,584 |
| 5 | 21,580 |
| 7 | 46,426 |
| 11 | too high to measure |

Example 5
Performance Testing Anti-Agglomerates in Bench Test Atmospheric Pressure Test The anti-agglomerates can also be evaluated in a bench-scale atmospheric pressure test. 3 ml of tetrahydrofuran (THF) and 9 ml ASTM synthetic sea water containing the desired amount of anti-agglomerate are placed in a capped test tube (15 mm OD×12.5 cm long) with a ⅜" stainless steel ball. The tubes are placed in a ferriswheel-type holder and placed in a cooling bath held at 0° C. The tubes are rotated to facilitate mixing of the samples. The tubes are monitored visually and recorded with a video camera. The time required for the stainless steel ball to stop moving due to hydrate crystal formation is measured as an indication of anti-agglomerate activity. The longer it takes the ball to stop, the better the anti-agglomerate.

The efficacy of two alkylpyrrolidone compounds (structures shown below) is demonstrated in Table 3 below. For these experiments, a small amount of sodium dodecyl-sulfate (SDS, 10% of the alkylpyrrolidone loading) was added to help solubilize the additives in water.

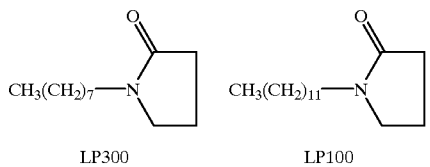

TABLE 3

Performance of Additives in Bench Test Atmospheric Pressure Test

| Additive | Concentration (wt %) | Ball Stop Time (minutes) |
|---|---|---|
| None | — | 10 |
| LP100 | 0.25 | 49 |
| LP300 | 0.5 | 109 |

Example 6

This example demonstrates the change in plugging temperatures as a function of butyl sulfate concentration performed in a test loop using methane and water.

The Hydrate Mini-Loop is characterized by piping connected in the form of a continuous loop 10 feet long and 0.5 inch in diameter. The loop is submersed in a temperature-controlled water bath. Before starting an experiment, the loop is charged with a standard mixture of gaseous hydrocarbons, condensate, and a synthetic sea water solution. The loop contents are circulated by a pump operated at a fixed speed. An accumulator, with a sliding piston dividing the gaseous loop contents from hydraulic oil, is utilized for maintaining pressure. The pressure is kept constant via a process control program. The program also dictates the temperature cycle for cooling the loop to hydrate-formation temperatures, and a re-heating to assure complete hydrate dissociation between cycles. The onset temperature is the point at which hydrate formation is first observed, characterized by a sudden uptake in the gaseous hydrocarbons/hydraulic oil. The plugging temperature is the point at which a significant increase in delta pressure is observed across the pump.

TABLE 4

Hydrate Miniloop Results For Butyl Sulfate

| Run ID | Butyl Sulfate (wt %) | Onset Temperature (° F.) | Plugging Temperature (° F.) |
|---|---|---|---|
| I/J | 0.00 | 57.5 | 57.5 |
| K/L | 0.10 | 56.4 | 56.4 |
| M/N | 0.25 | 56.2 | <37 |

What is claimed is:

1. A method for inhibiting the aggregation of clathrate hydrates in a mixture of hydrate forming substituents and water at a temperature approximately at or above $T_{eq}$ comprising:

adding into the mixture of hydrate forming substituents and water an effective amount of a hydrate anti-agglomerate having a polar head group directly connected to a nonpolar tail group selected from the group consisting of sodium valerate, 1-butanesulfonic acid Na salt, butanesulfate Na salt, a zwitterion having the formula

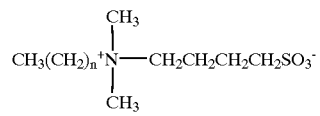

wherein n ranges from 3 to 7, and mixtures thereof.

2. A method according to claim 1 wherein the temperature ranges from about −18° C. to about 27° C.

3. A method according to claim 2 wherein the effective amount is about 0.05 to 5 wt % based on the wt % of the water in the mixture.

4. A method according to claim 1 further comprising adding the hydrate anti-agglomerate at pressures of about 0 to about 10,000 psi.

5. The method according to claim 1 wherein ethylene oxide is adducted to said nonpolar tail group of said anti-agglomerate.

6. A method according to claim 1 wherein the hydrate forming substituents are selected from the group consisting of methane, ethane, propane, isobutane, butane, neopentane, ethylene, propylene, isobutylene, cyclopropane, cyclobutane, cyclopentane, cyclohexane, benzene, oxygen, nitrogen, hydrogen sulfide, carbon dioxide, sulfur dioxide, chlorine and mixtures thereof.

7. The method according to claim 1 wherein the concentration of the anti-agglomerate in the water is less than about 30% of the critical micelle concentration.

* * * * *